United States Patent Office 3,801,551
Patented Apr. 2, 1974

3,801,551
MAKING FIBRILLAR MASSES OF
ACIDIC COPOLYMERS
Reinhard D. Bohme, Burr Ridge, Ill., assignor to The
Dow Chemical Company, Midland, Mich.
No Drawing. Filed July 5, 1972, Ser. No. 269,221
Int. Cl. C08f 27/00
U.S. Cl. 260—80.8
15 Claims

ABSTRACT OF THE DISCLOSURE

Fibrillar masses of acidic thermoplastic copolymers are obtained by digesting structured granules thereof in aqueous alkali. Granules from die orifice extruded strands of solid copolymer of ethylene and 16 weight percent acrylic acid, heated in dilute aqueous potassium hydroxide at 90° C., separate into masses of loose, fluffy fibrils.

REFERENCE TO RELATED APPLICATIONS

The subject matter of this application is related to that of a copending and commonly assigned patent application of Douglas S. Chisholm, Ser. No. 269,220, filed concurrently herewith, for "Means for Making Fibrillizable Structured Resin Granules."

BACKGROUND OF THE INVENTION

This invention relates to making fine fibers or fibrillar masses from normally solid polymers, especially organic addition copolymers containing a plurality of carboxylic acid groups in the polymeric structure thereof.

It is known to make fibrous and fibrillar forms of normally solid thermoplastic polymers by various mechanical means such as extrusion of molten materials or solvent solutions thereof through small orifice spinnerettes or by fibrillating certain longitudinally oriented films or filaments of crystalline copolymers or plastic compositions having incompatible constituents.

In a copending and commonly assigned application of Gordon D. McCann and Earl T. Dumitru, S.N. 765,635, filed Oct. 7, 1968 for "Method for Making Non-Colloidal Particles Like Fibers and Powders From Larger Granules of Ethylene/Carboxylic Acid Copolymers," it is disclosed that certain normally solid, water- and alkali-insoluble thermoplastic addition copolymers of ethylene containing a plurality but low concentration of carboxylic acid groups in the polymer structure thereof and in the form of molding granules and the like are converted to fine fibers by digesting such pieces in aqueous triethylamine at temperatures usually above 90° C. with gentle agitation. This is a chemical and physical-chemical phenomenon, and, although fibers are obtained which are many times longer than the greatest dimension of the starting granule, no fiber drawing or stretching mechanism or step is employed. However, as disclosed therein, the method and results of the referenced application are limited and restricted to those copolymers having a relatively low concentration of carboxylic acid groups, specifically from about 0.49 to about 1.53 milliequivalents (meq.) of carboxylic acid groups per gram of copolymer. This corresponds, for example, to copolymers of ethylene and from about 3.5 to about 11 weight percent of acrylic acid. It is further disclosed in the referenced application that granules of such copolymers having more than about 1.53 meq. of carboxylic acid groups, on digestion in aqueous alkali, tend to disintegrate into colloidal particles and do not form fibers.

It is an object of this invention to provide method and means to form fibrillar masses of normally solid thermoplastic organic addition polymers containing carboxylic acid groups on the polymeric structure thereof, particularly from such polymers containing larger proportions of carboxylic acid groups.

SUMMARY OF THE INVENTION

The objects of this invention, and other advantages thereof, are attained in a method as more fully described hereinafter, which comprises digesting, in aqueous alkaline media, granules of normally solid thermoplastic organic addition copolymers containing a plurality of carboxylic acid groups in the polymeric structure thereof, which solid granules are structured granules. By the term "structured granules" herein is meant that the internal physical structure of the solid granule comprises flow patterns and striations of polymeric material, particularly such wherein the flow patterns and striations are substantially aligned and parallel.

DETAILED DESCRIPTION AND EMBODIMENTS

In accordance with this invention, normally solid, water- and alkali-insoluble thermoplastic organic addition polymers containing a plurality of carboxylic acid groups in the polymeric structure thereof and in the form of structured granules are converted into fibrillar masses by digesting them in aqueous alkaline medium containing a base at least as basic as ammonia, such as ammonia, organic amines and quaternary ammonium hydroxides, and alkali metal hydroxides.

The polymers contemplated for use in accordance with this invention and illustrated in the examples that follow are organic addition polymers characterized in general in being materials that are normally solid (i.e., per se solid at normal room temperature), normally insoluble in water and in aqueous alkali (i.e. substantially insoluble both in the acid form and in neutral salt form in liquid water at normal room temperature in the absence of mutual solvents), and thermoplastic (i.e. capable of being reversibly softened by heat and hardened by cooling and moldable at temperatures below their decomposition temperature). The macromolecules of the addition polymer can be of any chemical structure provided that the massive material has the general physical properties just mentioned and further provided that the molecular structure of at least one such polymer in the structured granules contains a plurality of carboxylic acid groups. By "acid group" is meant a group capable of neutralization by aqueous base to form a salt, including the carboxylic acid group ($-CO_2H$) and the carboxylic acid anhydride group which react with aqueous base such as sodium hydroxide to form water ionizable salt groups. The bulk of the polymeric macromolecular structure to which the acid group is attached can be of any chemical structure provided (as stated above) the material has the required general physical properties and is chemically stable to conditions of treatment with aqueous base whereby the acid groups are neutralized. It will be understood that the requirement that the polymer be thermoplastic precludes any extensive degree of covalent bond cross-linking in the polymer molecular structure, although the macromolecular chains may otherwise be linear, or branched, or lightly crosslinked or associated by intermolecular forces such as by crystallization, hydrogen bonding, or ionic linkages.

It is an additional requirement of the polymers of this invention that they be swellable in aqueous alkaline media; by this is meant that a solid piece of the polymeric plastic material having at least one dimension of not more than 1 mm. swells when immersed in aqueous potassium hydroxide of 1 N concentration at room temperature such that the ratio of its weight at maximum swelling to its original weight is at least 1.2.

Typical acid polymers are addition polymers of ethylenically unsaturated monomers where the starting monomers include one having an acid group of the kind specified. For example, suitable polymers are the copolymer products of copolymerization of mixtures of one or more polymerizable ethylenically unsaturated carboxylic acids such as acrylic acid, methacrylic acid, maleic acid and anhydride, itaconic acid, fumaric acid, citraconic acid and anhydride, methyl hydrogen maleate, and the like, and one or more non-acid polymerizable monomers, such as ethylene, propylene, butene-1, 1,3-butadiene, and other aliphatic olefins; styrene, α-methylstyrene, vinyltoluene, chlorostyrene, and other aromatic olefins; ethyl acrylate, methyl methacrylate, vinyl acetate and other unsaturated esters; vinyl and vinylidene chloride; vinyl ethers; acrylamide; acrylonitrile; and the like.

In general, the requirements of this invention are met in such copolymers of ethylenically unsaturated monomers wherein the acid comonomer moiety is at least about 11 weight percent of the copolymer when the remaining monomer moiety is non-polar such as hydrocarbon, and in copolymers wherein acid comonomer moiety is at least about 8 weight percent of the copolymer when the remaining monomer moiety comprises about 5 or more weight percent based on the copolymer of polar monomer such as an ester comonomer, the acid comonomer moiety of the copolymer usually being not more than about 40 weight percent of the copolymer. Particularly suitable copolymers include:

(1) Copolymers of at least about 60% by weight ethylene and from about 11 to about 30% by weight of one or more ethylenially unsaturated acids such as acrylic acid, methacrylic acid, methyl hydrogen maleate, etc., as above recited.

(2) Copolymers of at least about 60% by weight of ethylene, from about 8 to about 30% by weight of one or more ethylenically unsaturated acids, and from about 5 to about 20% by weight of one or more other monomers such as ethyl acrylate, vinyl acetate, etc., as above recited.

(3) Copolymers of styrene (and/or other ar-vinyl-aromatic compounds) and from about 11 to about 30% by weight of one or more ethylenically unsaturated acids such as acrylic acid, maleic anhydride, etc., as above recited.

Other polymers are made from preformed and non-acid polymers by subsequent chemical reaction carried out thereon. For example, the carboxylic acid group may be supplied by grafting a monomer such as acrylic acid or maleic anhydride, onto a polymer substrate; carboxylic anhydride, ester, amide, acyl halide, and nitrile groups can be hydrolyzed to carboxylic acid groups.

Carboxylic acid-containing polymers can also be used in the form of salts such as the ionomer resins wherein at least a part of the carboxylic acid groups is neutralized with a salt-forming cation such as metal ions having valences of 1 to 3, inclusive, or with ammonia or organic bases such as amines.

Specific examples and illustrations of representative organic acid copolymers, given for purposes of illuminating the description and not to limit the scope of the invention are:

ethylene/acrylic acid copolymers,
ethylene/methacrylic acid copolymers,
ethylene/itaconic acid copolymers,
ethylene/methyl hydrogen maleate copolymers,
ethylene/maleic acid copolymers,
ethylene/acrylic acid/methyl methacrylate (ternary) copolymers,
ethylene/acrylic acid/ethyl acrylate copolymers,
ethylene/methacrylic acid/ethyl acrylate copolymers,
ethylene/itaconic acid/methyl methacrylate copolymers,
ethylene/methyl hydrogen maleate/ethyl acrylate copolymers,
ethylene/acrylic acid/vinyl acetate copolymers,
ethylene/methacrylic acid/vinyl acetate copolymers,
ethylene/acrylic acid/vinyl alcohol copolymers,
ethylene/propylene/acrylic acid copolymers,
ethylene/acrylamide/acrylic acid copolymers,
ethylene/styrene/acrylic acid copolymers,
ethylene/methacrylic acid/acrylonitrile copolymers,
ethylene/fumaric acid/vinyl methyl ether copolymers,
ethylene/vinyl chloride/acrylic acid copolymers,
ethylene/vinylidene chloride/acrylic acid copolymers,
polyethylene/acrylic acid graft copolymers,
polyethylene/methacrylic acid graft copolymers,
polymerized ethylene/propylene/acrylic acid graft copolymers,
styrene/acrylic acid copolymers,
styrene/methacrylic acid copolymers,
styrene/itaconic acid copolymers,
styrene/methyl methacrylate/acrylic acid copolymers,
styrene/maleic anhydride copolymers,
styrene/citraconic anhydride copolymers,
ar-chlorostyrene/acrylic acid copolymers,
ar-t-butylstyrene/acrylate acid copolymers,
methyl methacrylate/isobutyl acrylate/acrylic acid copolymers.

Specific procedures and means for making polymers are known to the art and do not constitute the essence of the present invention. While particular polymers are used in the description of the invention for purposes of illustrating the same, it will be understood that other polymers may be used. The suitability of any polymer for the present purposes can be readily ascertained by a few preliminary tests following the present description; this is particularly advantageous when the starting polymeric material is of unknown composition or history and it is not possible to ascertain its exact chemical structure.

The structured granules used herein, as above-indicated, are pieces of solid plastic resin which have, in the internal physical structure thereof, flow patterns and striations of polymeric material forming coherent strandules (miniature or microscopic strands) which are preferably substantially aligned and parallel. Such structures can be induced into the starting resin and structured granules thereof can be obtained most simply by heat plastifying the starting thermoplastic material and causing it to flow through a channel which applies a compressive force having at least one vector normal to the direction of flow, while preventing or minimizing turbulent mixing across the lines of flow, particularly at the last stage of such compressive flow, and lowering the flowability of the resin to "freeze in" the resulting structure. The compressive force can be generated by causing at least one cross-sectional dimension of the channel to become smaller in the direction of flow, provided that any increase in longitudinal rate of flow does not induce turbulence. Preferably, the heat-plastified resin mass is treated during the described flow to generate a multiplicity of phase-distinct internal subdivisions of the flowing mass, for example by interposing stream-lining screens, orifice plates or interface generator elements in the flowing stream, or by differential cooling. The action of such interface generators diminishes the need for compressive force vectors, but it is preferable to keep the flow stream confined in the channel until the viscosity of the mass is increased sufficiently so that the resulting internal structure is self-sustaining. After passing through the channel as described, the flowing mass with its resulting internal structure is cooled, hardened and cut into granules which, accordingly, have the same internal structure.

Another means for inducing or augmenting the multi-phase-distinct internal structure of resin granules for the purposes of this invention is to blend starting granules of compatible but different starting resins, heat plastify the blend without homogeneously intermixing the components to molecular homogeneity, and cause the blended heat-plastified mass to flow out through a channel as above indicated. In another variation, the starting different resins are separately heat-plastified and in that form are commingled to the extent indicated to obtain the strandular structure, e.g. by passing through a conduit fitted with multi-stage interface surface generator elements which sub-divide the interlayer the streams without causing substantial cross-stream mixing. The starting resins can be different in numerous ways and degrees. For example, copolymer resins of the same comonomeric moieties but in different proportions can be used, such as two ethylene/acrylic acid copolymers of different percentage acrylic acid. Two copolymer resins of the same comonomers in the same proportions but having different melt flow values (Melt Indexes) can be used. Two copolymer resins which have one common comonomer but different second comonomers can be used, such as a mixture of ethylene/acrylic acid copolymer with ethylene/methacrylic acid copolymer, or a binary copolymer can be mixed with a ternary copolymer. Further, a resin within the scope of those which form fibrillar masses in accordance with this invention can be blended with a resin which does not by itself form such fibrillar products, and structured granules suitable for use herein can be prepared from such blend.

In connection with the blending of diverse resins to enhance the formation of structured granules, it is important to observe that the starting diverse resins are sufficiently compatible with each other to be capable of forming a substantially homogeneous blend. Thus, the here resulting internally structured product is not like that resulting, for example, by co-extrusion of a mixture of incompatible resins. The latter, in the form of a solid strip, for example, on bending sometimes splits or delaminates into a fibrous bundle. In contrast, the internally structured product here employed is superficially homogeneous and does not separate or delaminate even when bent sharply. Under microscopic examination, however, the internal structure can be seen as striations of phase-distinct material. Accordingly, although the starting diverse resins are compatible, it is important to observe that for the present purposes a mixture thereof is preferably formed into an internally structured mass without fully homogenizing or compatibilizing the mass.

The formation of internally structured granules by blending of diverse compatible resins, heat plastifying the resulting blend without fully homogenizing the same, and forming the heat-plastified mass into strands and thence into granules is the invention of Douglas S. Chisholm and the subject of the above-referenced patent application concurrently filed herewith, Ser. No. 269,220, entitled "Means for Making Fibrillizable Structured Resin Granules."

By the term "granule" as used herein is meant a solid small but non-colloidal piece of the polymeric material, such as one having no dimension smaller than about 25 microns. Preferably, the dimension in the direction of the interfacial phase lines of the structured granule is at least about 3 mm. since this dimension principally determines the length of the resulting fibrils and can be as long as can be handled in the subsequent steps of the process. The dimensions normal to the direction of the interfacial phase lines of the structured granules principally affect the time required for substantially complete penetration of the alkaline liquid into the structured granule and are preferably not greater than about 6 mm. Suitable granules are those of the kind commonly used for plastics molding and are in the nature of short lengths chopped from strandular extrusions having cylindrical, ovoid, or prismatic configurations, sectional dimensions (diameter) in the order of about 3 to about 6 mm., and equal or greater length.

The process of this invention is carried out by digesting structured granules of the polymer as described with an alkaline aqueous liquid medium as a continuous enveloping phase until the granules are substantially swollen, then subjecting the swollen granules to high shear as by intensive stirring until the fibrillar structure is substantially opened. The reulting fibrillar polymeric material can then be recovered and/or further processed.

The base in the alkaline aqueous medium used in fibrilizing the structured granules is any base which in water solution is at least as basic as ammonia, e.g. any one or mixture of the alkali metal hydroxides such as lithium hydroxide, sodium hydroxide, potassium hydroxide, rubidium hydroxide and cesium hydroxide, and the nitrogenous bases such as ammonium hydroxide and watersoluble strong base organic amines such as mono-, di-, and tri-methylamine, -ethylamine, -isopropylamine, and -isobutylamine, cyclohexylamine, piperidine, etc., which form salts with the acid groups in the polymer, tetramethylammonium hydroxide, tetraethylammonium hydroxide, benzyltrimethylammonium hydroxide, trimethyl-(dodecylbenzyl)ammonium hydroxide, and the like.

The concentration of the base in the aqueous medium is in part a function of the concentration of the acid group in the starting polymer and the desired ratio of base to the acid groups in such polymer. Usually the amount of base corresponds to at least about 0.4 equivalent per acid group in the polymer, preferably from about 0.5 to about 1 equivalent of base per equivalent of acid group in the polymer when the base is an alkali metal hydroxide, larger amounts being preferred when weaker bases are used. When the starting acid polymer contains a carboxylic acid anhydride as the acid group, such group is counted as two equivalents of acid group for purpose of computing the number of equivalents of base required for neutralization.

The amount of aqueous medium relative to the amount of starting polymer is selected so that the aqueous liquid medium surrounds and envelops the structured granule. Usually, the amount of aqueous medium is at least equal in volume to the starting polymer granules and may be as much larger as desired to make more dilute fibril slurries. Generally, from about 1 to about 20 parts by weight of aqueous medium is charged per part by weight of starting polymer granules, preferably so that the amount of starting granules is from about 5 to about 20 percent by weight of the combined granules and aqueous medium. Of course, a more concentrated fibril slurry product can be subsequently diluted.

The digestion step is carried out by simply holding together the starting structured granules and aqueous alkaline liquid medium, conveniently in a vessel such as a kettle adapted for holding the contents in the solid/liquid state under autogenous pressure when volatile bases and/or higher temperatures are used. The digestion can also be carried out in an elongated pipeline vessel, it being necessary only to provide good contact and exposure of the polymer granules to the enveloping aqueous alkaline liquid medium and to provide heat. The digestion and fibrillation process is accelerated by heat. Usually temperatures of from about 60° to about 90° C. and higher, but below the melting point of the polymer in the starting granules, are employed.

The first stage of the fibrillation is a swelling of the structured granule. The time required to effect substantial swelling of the granule is generally inverse to the temperature, to the concentration of acid groups in the polymer, and to the ion strength of the aqueous base and is usually in the order of from several hours to about 30 hours with conventional molding grade granules. When at least one of the transverse dimensions of the granules is relatively small, the digestion time may be shorter than when these dimensions are larger. During this swelling stage, agitation is not particularly effective except to provide heat transfer and to keep the granules separate. As the granules swell in the alkaline medium, their striated structure begins to separate into fibrils and fibril bundles. When the swelling is complete or substantially complete, it then becomes advantageous to subject the mixture to high shear stirring to assist in opening up the swollen mass and to separate the fibrils. This latter stage of fibrillation by high shear agitation does not require the presence of the starting alkaline liquor if the swelling is substantially complete, and it is often advantageous to decant the alkaline digestion medium from the swollen granules, resuspend the latter in fresh water, and subject the slurry to high shear agitation to convert the swollen granules to fibrils.

After the final fibrillation step, the resulting fibrils can be treated, collected, and/or further processed in any desired manner. Thus, the fibrils can be separated from the aqueous medium by decantation or filtration, washed with water and dried to form loose fluffy masses of fibrils in which the acid groups of the polymer may occur at least partly in association with the base used in the digestion medium. Alternatively, the fibrils while still in aqueous suspension can be treated with acid such as dilute hydrochloric acid whereby the acid groups of the polymer are put into free acid form; subsequent washing and drying then provides fluffy fibril masses in which the acid groups of the polymer occur substantially in the free acid form. If an acid wash is used, the kind of acid is not critical, and dilute common acids such as hydrochloric, sulfuric, sulfurous, nitric, phosphoric, phosphorous, acetic, etc. can be used. It is usually desirable to wash such excess acids out of the fibril masses before drying them. The drying step is, of course, carried out at temperatures well below the melting or softening point of the fibrils to avoid fusion.

The fibrils formed in this manner are small even microscopic, in thickness, varying somewhat with the vigor of the digestion and shear during preparation, generally from about 0.2 micron to bundles of about 50 microns. The length is generally in the order of the length of the starting pellet or granule, but occasional fibers are several times larger than the starting granule. Microscopic examination of the thicker fibers usually shows them to be internally striated, indicating that the fibrillation was not complete in that instance.

Fibrils formed by this process are characteristically irregular in thickness and cross-sectional configuration along their length, being usually ribbonlike and having a splintered or slivered appearance. In this respect they are uniquely different from extruded or drawn filaments of thermoplastic polymers.

The fibril products of the herein-described process are useful in themselves and in admixture with other fibrous materials such as cellulosic fibers, hair, synthetic fibers and the like in making felted articles, paper-like products, filters for fluids and the like. The fibrous masses can be shaped into cups or other articles and the density and porosity of the material can be modified by heat and pressure.

Other characteristics, features and details of this invention and the products thereof are shown in the following examples which illustrate the invention but are not to be taken as limiting the same. Unless otherwise indicated, parts and percentages are by weight. All of the polymers used in these examples were normally solid, water- and alkali-insoluble thermoplastic ethylene copolymer resins made by conventional means known in the art.

Where, in the examples, a "melt flow value" of the polymer is given, this melt flow value is a measure of the flow properties of the thermoplastic material as obtained in the apparatus and by the general procedure described in the ASTM method designation D 1238–65T (Condition E).

Example 1

In this example there was used a binary copolymer of about 83.2% ethylene and about 16.8% acrylic acid (product of polymerization of a mixture of ethylene and acrylic acid) having a melt flow value of 2.2 decigrams per minute. The copolymer was extruded at a minimum extrusion temperature through a stranding die into round strands about 4.75 mm. in diameter, hardened by cooling and chopped into cylindrical granules about 4.75 mm. long. The resulting granules were "structured" granules as hereinbefore defined, having an internally striated and layered structure in the direction of the extrusion.

Two hundred grams of the above structured granules were heated in three liters of aqueous alkali, containing 0.8 equivalent of potassium hydroxide per equivalent of acid group in the starting copolymer, at about 90° C. for about twenty hours. The granules became highly swollen and began to break up into fibrous bundles. The alkaline liquor was decanted and replaced with water, and the resulting slurry was subjected to vigorous stirring and high shear in a Waring Blendor for one-half hour, whereby the swollen granules were converted to fibrillar masses. The slurry was drained through a filter and, without compacting the fibrils, they were washed successively with water, dilute hydrochloric acid, and again with water, and finally dried at about 60° C. whereby a loose fluffy mass of white fibers was obtained.

Example 2

Structured granules of a binary copolymer of about 70% ethylene and about 30% acrylic acod (product of polymerization of a mixture of ethylene and acrylic acid) having a melt flow value of 20 decigrams per minute were digested in 2 N KOH in the manner of Example 1, then subjected to high shear stirring, washed and dried as described in the previous example. A fluffy mass of white fibers was obtained.

For purposes of contrast thereto, another quantity of the same starting granules that were used in Example 2 was heated for one hour at 120° C. in an oven, which treatment was calculated to anneal the granules and to cause the internal structure to become random, obliterating the parallel flow patterns and striations that were present initially. When such annealed granules were digested in alkali in the manner of Example 2, the granules swelled but crumbled into fine fragments; no fibrillation and no fibril formation occurred by digestion of the non-structured granules.

Example 3

In separate tests, structured granules were prepared in the manner of Example 1 by heat plastifying and extruding through a stranding die (a) a binary copolymer of about 88.8% ethylene and about 11.2% acrylic acid having melt flow value of 8.5 decigrams per minute and (b) a ternary copolymer of about 84.5% ethylene, about 7.8% ethyl acrylate, and about 7.7% acrylic acid having melt flow value of 20.9 decigrams per minute. Each of these structured polymer granules, when digested in dilute KOH in the manner of Example 1, subjected to high shear, washed and dried, yielded fluffy white masses of fibrils. Analysis indicated that some of the ethyl ester groups in the terpolymer (b) hydrolyzed during the treatment. The cross-sectional dimensions of the resulting fibrils were generally less than about 70 microns.

Example 4

(1) Ten pounds of solid molding pellets of low-density polyethylene and ten pounds of solid molding pellets of a binary copolymer of about 84.4% ethylene and about 15.6% acrylic acid were mixed by tumbling the solid pellets together in a container. A portion of the resulting mixture was charged to the hopper of a screw-type extruder with a stranding die and extruded at a maximum temperature of 250° F. The cooled and hardened strand was chopped into granules that were like conventional molding pellets. These granules were superficially homogeneous, and a sample of the strand at room temperature could be bent at a sharp angle without fibrillation or delamination. However, under a microscope, the granules could be seen to have striations and flow lines in the direction of extrusion; i.e., they were structured granules. When these structured granules were digested at 90° C. in dilute KOH and the resulting swollen granules were then subjected to vigorous shearing agitation as described in Example 1, there was recovered therefrom about 75% of the starting granules in the form of fibers; the remainder of the starting granules was converted to a colloidal latex-like dispersion which could easily be separated from the fibers by draining and washing.

(2) Another portion of the above-described mixture of pellets of polyethylene and pellets of ethylene/acrylic acid copolymer was extruded in the manner described but at a maximum temperature of 400° F. The resulting granules were similarly digested until swollen in dilute KOH at 90° C. and sheared. There was recovered about 50% of the starting granules in the form of fibers that were considerably finer than those obtained from granules made by extrusion at 250° F. The remainder of the starting granules was converted to latex-like colloidal dispersion easily separable from the fibrous product.

The contrast in amount of fibrous product recovered and the fineness of such fibers is a reflection of the differences in the structure of the granules obtained by extrusion at the different temperatures. At the higher extrusion temperature, the plastic materials have lower viscosity and they mix together more thoroughly; there is a tendency for the composition to approach becoming one phase, homogeneous and non-structured, and the multiphase structure which does result is finer. At the lower extrusion temperature, the plastic phases have less tendency to homogenize but instead tend to flow out or string out with only incomplete interfacial blending so that the resulting granules are more highly structured and have somewhat coarser structure.

Better results in terms of higher yield of fine fibrils are obtained when the starting diverse polymer materials are first separately heat plastified and streams of the resulting heat plastified plastics are subdivided and interlayered by passing them together through a multistage interface surface generator without substantial cross-stream mixing.

Substantially the same results are obtained by digestion in alkaline aqueous medium and shear of structured granules when the structured granules are obtained by stranding extrusion at relatively low temperature of mixed pellets of polymers where, instead of the mixture of polyethylene and ethylene/acrylic acid copolymer, mixtures of pellets of the following combinations of polymers are used:

(3) Mixture of (a) copolymer of ethylene and about 9% acrylic acid and (b) copolymer of ethylene and about 16% acrylic acid;

(4) Mixture of (a) binary copolymer of ethylene and 16% acrylic acid and (b) ternary copolymer (terpolymer) of 84% ethylene, 8% ethyl acrylate, and 8% acrylic acid;

(5) Mixture of (a) high density, linear polyethylene and (b) binary copolymer of ethylene and 14% acrylic acid.

In instances where a blend of diverse polymers is used to make structured granules for conversion to fibrillar materials according to this invention, and wherein at least one of the polymers is per se incapable of making fibrils and at least one of the other polymers is per se capable of making fibrils by this process, the diverse polymers can be mixed in proportions of up to about 75% of the per se non-fibril-forming polymer and at least about 25% of the per se fibril-forming polymer. For example, structured granules suitable for the present purposes can be made with up to about 75% of polyethylene, polypropylene, polystyrene, copolymers of ethylene and less than about 8% acrylic acid, etc., and at least about 25% of copolymers of ethylene and from about 11% to about 35% acrylic acid or methacrylic acid, terpolymers of ethylene with from about 11% to about 35% acrylic or methacrylic acid and another comonomer such as propylene, vinyl acetate, styrene or the like, terpolymers of ethylene with from about 8% to about 20% ethyl acrylate and from about 8% to about 20% acrylic acid, etc.

Example 5

In separate tests, fibrils are obtained from structured granules of the polymer materials listed below. The structured granules were obtained by strandular extrusion at minimum temperature of the polymer materials and chopping the strands after cooling to form substantially cylindrical pieces about 4.75 mm. in diameter and length. Two hundred grams of the granules are digested in three liters of aqueous potassium hydroxide, containing about 0.8 equivalent of KOH per equivalent of acid group in the polymer of the granules, by heating the digestion mixture at 90° C. for about 16 hours. The aqueous alkaline liquid is then decanted from the swollen and partially fibrillated granules and replaced with water. The resulting slurry is then subjected to high shear in a Waring Blendor for about one-half hour, whereby a slurry of highly fibrillated material is produced. The slurry is drained on a filter, the loose fluffy fiber is washed with water, dilute hydrochloric acid, again with water and finally dried at not more than about 60° C. to white, fluffy fibrous material.

The polymers used in the starting structured granules are as follows:

(1) A binary copolymer of 84% ethylene and 16% methacrylic acid, having melt flow value of about 5 decigrams per minute;
(2) A binary copolymer of 80% styrene and 20% acrylic acid, having melt flow value of about 5 decigrams per minute; and
(3) A terpolymer of about 78% ethylene, about 11% ethyl acrylate, and about 11% acrylic acid having melt flow value of about 20 decigrams per minute.

Example 6

Structured granules of a binary copolymer of about 70% ethylene and about 30% acrylic acid having melt flow value of about 20 decigrams per minute are digested for 16 hours at 90° C. in aqueous base. In separate tests, per 100 grams of copolymer granules, there are used one liter of solutions of these bases:

(1) Sodium hydroxide, 0.1 N
(2) Lithium hydroxide, 0.1 N
(3) Potassium hydroxide, 0.1 N
(4) Tetramethyl ammonium hydroxide, 0.1 N
(5) Tetraethyl ammonium hydroxide, 0.1 N
(6) Trimethyl (dodecylbenzyl) ammonium hydroxide, 0.1 N
(7) Ammonium hydroxide, 2 N
(8) Piperidine, 0.1 N After digestion, the resulting swollen granules are removed from the alkaline liquid, re-suspended in water, and subjected to high shear for about one-half hour. The resulting fibrillated material is collected by draining and is washed with water, dilute acid, again with water and dried at below 60° C. to obtain fluffy white fibrils of the starting copolymer.

When prepared in the manner described, the copolymer fibrils are white and relatively opaque. On careful heating above 60° C. but below their temperature of complete fusion, the fibrils become more transparent and clear, but substantially colorless.

The fibrils herein described can be slurried in water and collected in a thin layer on a screen or felt, dewatered and dried to form matted fibrous articles which can be pressed to increase their density. Similarly, the fibril slurry can be made to contain other fibrous or filamentary material such as cotton fibers, wood pulp, rayon or nylon filaments, and the like, and the resulting mixed fibrous material collected, dried, pressed or the like to form composite articles suitable for use as unwoven fabric, filter media, porous barriers, and the like.

What is claimed is:
1. A method for making fibrillar masses of polymeric material which comprises digesting in aqueous alkaline media structured solid granules of the polymeric material which is composed of normally solid thermoplastic addition polymer of ethylenically unsaturated monomers that is normally insoluble in water and in aqueous alkali and wherein there is at least one such addition polymer that is an acid copolymer of at least one ethylenically unsaturated carboxylic acid monomer and at least one ethylenically unsaturated non-acid monomer in which the carboxylic acid monomer is at least about 11 weight percent of the acid copolymer when the remaining monomer therein is non-polar and the carboxylic acid monomer is at least about 8 weight percent of the acid copolymer when the remaining monomer therein comprises at least about 5 weight percent based on the acid copolymer of polar monomer, and the carboxylic acid monomer is not more than about 40 weight percent of the acid copolymer, such acid copolymer being present in amount of at least about 25 weight percent of the whole polymeric material, the polymeric material in the structured granule being swellable by 1 N potassium hydroxide solution at room temperature, the structured granules being ones wherein the internal structure by microscopic examination is visible as striations and coherent miniature strands of phase-distinct material and which granules are at least about 3 mm. long in the direction of the striations and have no dimension less than about 25 microns, the aqueous alkaline medium containing a base at least as basic as ammonia and in amount of at least about 0.4 equivalent per acid group in the acid copolymer, continuing the digestion at temperature at which the starting granules swell in the aqueous alkaline medium and below the softening temperature of the polymeric material until the structured granules are substantially swollen, then subjecting the resulting swollen granules in aqueous suspension to high shear by intensive stirring of the suspension whereby the wollen granules are converted to fibrils characteristically irregular in thickness and cross-section along their length and generally ribbon-like and splintered.

2. The method according to claim 1 wherein the structured granules are composed essentially of a copolymer of at least about 60 percent ethylene and from about 11 to about 30 percent of a carboxylic acid selected from the group consisting of acrylic acid and methacrylic acid, the percentages being by weight based on the copolymer.

3. The method according to claim 2 wherein the copolymer is a binary copolymer of ethylene and the carboxylic acid.

4. The method according to claim 1 wherein the structured granules are composed essentially of a terpolymer of ethylene, from about 8 to about 20 percent ethyl acrylate, and from about 8 to about 30 percent of a carboxylic acid selected rfom the group consisting of acrylic acid and methacrylic acid, the percentages being by weight based on the copolymer.

5. The method according to claim 1 wherein the structured granules are composed of at least two different addition polymers, at least one of which is an acid copolymer of at least about 60 percent ethylene and from about 11 to about 30 percent of a carboxylic acid selected from the group consisting of acrylic acid and methacrylic acid, the percentages being by weight based on the copolymer, said acid copolymer being present in amount of at least about 25 percent by weight of the total polymeric material in the granules.

6. The method of claim 5 wherein the structured granules are composed essentially of polyethylene and the acid copolymer, and wherein the acid copolymer is a binary copolymer of ethylene and the carboxylic acid.

7. The method of claim 1 wherein the digestion is carried out at temperature from about 60° to about 90° C.

8. The method of claim 1 wherein the aqueous alkaline medium is separated from the swollen granules, the latter are re-suspended in water and the resulting suspension is subjected to high shear by intensive stirring of the suspension whereby the swollen granules are converted to fibrils.

9. The method of claim 1 wherein the resulting fibrils are drained to separate the aqueous medium, and are washed successively with water, dilute aqueous acid, and water, and the resulting fibrils are finally dried at temperatures below their fusion temperature.

10. The method according to claim 1 wherein the digestion is carried out at temperature from about 60° to about 90° C. until the granules are substantially swollen, the alkaline medium is separated from the resulting swollen granules, the latter are re-suspended in water and, in the resulting suspension, are subjected to high shear by intensive stirring of the suspension whereby the swollen granules are converted to fibrils, the aqueous medium is drained from the resulting fibrils and the latter are washed successively with water, dilute aqueous acid, and water, and the resulting fibrils are finally dried at temperature below their fusion temperature.

11. The method according to claim 10 wherein the structured granules are composed essentially of a copolymer of at least about 60 percent ethylene and from about 11 to about 30 percent acrylic acid based on the weight of the copolymer.

12. The method according to claim 11 wherein the copolymer is a binary copolymer of ethylene and acrylic acid.

13. The method according to claim 10 wherein the structured granules are composed essentially of a terpolymer of ethylene, from about 8 to about 20 percent ethyl acrylate and from about 8 to about 30 percent acrylic acid, based on the weight of the terpolymer.

14. The method according to claim 10 wherein the structured granules are composed of at least two different addition polymers, at least one of which is an acid copolymer of at least about 60 percent ethylene and from about 11 to about 30 percent acrylic acid, based on the weight of the copolymer, said acid copolymer being present in amount of at least about 25 percent by weight of the total polymeric material in the granules.

15. The method according to claim 14 wherein the structured granules are composed essentially of polyethylene and the acid copolymer, and wherein the acid copolymer is a binary copolymer of ethylene and acrylic acid.

References Cited
UNITED STATES PATENTS

| | | | |
|---|---|---|---|
| 2,538,273 | 1/1951 | Rhines | 260—96 |
| 3,202,638 | 8/1965 | Van Ess | 260—78.5 |
| 3,296,172 | 1/1967 | Funck et al. | 260—29.6 |
| 3,364,164 | 1/1968 | Lyons | 260—29.6 |
| 3,389,109 | 6/1968 | Harmon et al. | 260—29.6 |
| 3,472,825 | 10/1969 | Walter et al. | 260—88.1 |
| 3,494,903 | 2/1970 | Kochar | 260—86.7 |
| 3,677,989 | 7/1972 | Jenkinson | 260—29.6 H |

STANFORD M. LEVIN, Primary Examiner

U.S. Cl. X.R.

260—8, 17.4 CL, 78.5 R, 78.5 T, 80.3 E, 80.3 N, 82.1, 85.5 P, 85.7, 86.1 R, 87.5 R, 88.1 PC, 88.1 R, 878 R

UNITED STATES PATENT OFFICE
CERTIFICATE OF CORRECTION

Patent No. 3,801,551          Dated April 2, 1974

Inventor(s) Reinhard D. Bohme

It is certified that error appears in the above-identified patent and that said Letters Patent are hereby corrected as shown below:

Column 1, line 37, the word "copolymers" should be --polymers--.

Column 2, line 66, after the word "than", insert the word --about--.

Column 3, line 30, the word "ethylenially" should be --ethylenically--.

Column 5, line 3, the word "the", should be --and--.

Column 5, line 73, the word "reulting" should be --resultin

Column 8, line 22, the word "acod" should be --acid--.

Column 10, line 6, the word "tne" should be --the--.

Column 11, line 36, the word "wollen" should be --swollen--

Column 11, line 53, the word "rfom" should be --from--.

Signed and sealed this 1st day of October 1974.

(SEAL)
Attest:

McCOY M. GIBSON JR.          C. MARSHALL DANN
Attesting Officer          Commissioner of Patents

PO-1050
(5/69)

UNITED STATES PATENT OFFICE
CERTIFICATE OF CORRECTION

Patent No. 3,801,551        Dated April 2, 1974

Inventor(s) Reinhard D. Bohme

It is certified that error appears in the above-identified patent and that said Letters Patent are hereby corrected as shown below:

Column 1, line 37, the word "copolymers" should be --polymers--.

Column 2, line 66, after the word "than", insert the word --about--.

Column 3, line 30, the word "ethylenially" should be --ethylenically--.

Column 5, line 3, the word "the", should be --and--.

Column 5, line 73, the word "reulting" should be --resulting--

Column 8, line 22, the word "acod" should be --acid--.

Column 10, line 6, the word "tne" should be --the--.

Column 11, line 36, the word "wollen" should be --swollen--.

Column 11, line 53, the word "rfom" should be --from--.

Thie certificate supersedes Certificate of Correction issued October 1, 1974.

Signed and sealed this 12th day of November 1974.

(SEAL)
Attest:

McCOY M. GIBSON JR.
Attesting Officer

C. MARSHALL DANN
Commissioner of Patents